Figure 1:
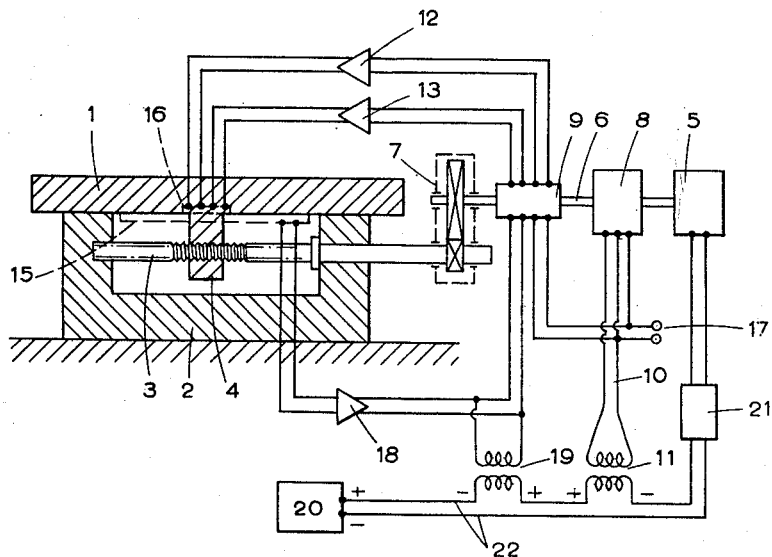

Inventors
J. H. Phillips
R. H. Booth
By Glascock Downing Seebold
Attys.

United States Patent Office 3,111,614
Patented Nov. 19, 1963

3,111,614
AUTOMATIC POSITION MOTOR CONTROL DEVICE USING INDUCTIVE BALANCE NETWORK
James Hugh Phillips, Cookham, and Richard Herbert Booth, Beaconsfield, England, assignors to Electric & Musical Industries Limited, Middlesex, England, a company of Great Britain
Filed June 16, 1959, Ser. No. 820,799
Claims priority, application Great Britain June 19, 1958
11 Claims. (Cl. 318—30)

This invention relates to position control apparatus for use in automatic positioning systems. The invention relates especially to position control apparatus for automatic machine tools.

In automatic position control systems, as applied to machine tools, it is usual to displace the worktable or some other part of the machine by means of a servo motor. The input signal for the servo motor is provided by comparing a command signal, which represents the desired displacement of the machine part, with a feedback signal which represents the actual displacement of the machine part. In practice, some difficulty is experienced in deriving a feedback signal which can be said with assurance to represent the actual displacement of the machine part. For example the servo motor may be arranged to produce displacement of the machine part through the intermediary of a lead screw and gears, and the feedback signal may be set up by means of rotary potentiometers connected in cascade and driven by the servo motor. However in this case the presence of backlash in the transmission to the lead screw, variations in pitch of the lead screw, elasticity in the transmission shafts and nonuniformity in gearing may be such that the feedback signal is not in fact representative of the actual displacement of the machine part. The difficulty can be reduced by employing, for the derivation of the feedback signal, a resolver which comprises inductors constituted by planar zig-zag conductors. In this case one inductor may be fitted directly as a scale to the support for the machine part displaced by the servo motor, and other inductors may be fitted directly to that machine part. The signals derived from such a resolver then depend on the position of the worktable directly but there is a disadvantage that the signal is periodic and may represent a displacement in any cycle of the zig-zag conductors. Therefore some means are necessary in establishing the position of a machine part to the nearest cycle. Further this form of apparatus is critically dependent upon the spacing of the scale inductors and the slide inductors.

The object of the present invention is to provide an improved position control apparatus in which errors due to backlash, elasticity, variations in pitch and non-uniformity of gearing can be substantially avoided.

According to one aspect of the present invention there is provided position control apparatus comprising a displaceable part, drive means, a mechanical coupling which is liable to transmission error for producing displacement of said part in response to said drive means, two resolvers which are mechanically coupled respectively to said drive means and to said part by means which are substantially less liable to transmission error than said mechanical coupling, means for applying a reference signal to one of said resolvers, means interconnecting said resolvers electrically to produce in response to said reference signal an electrical error signal substantially proportional to the transmission error of said mechanical coupling, and means for imparting displacement to said part in response to and in such sense as to reduce said error signal and thereby reduce said transmission error.

According to another aspect of the present invention there is provided position control apparatus comprising a first displaceable part, a second part, two resolvers responsive respectively to displacements of said parts, means for applying a reference signal to one of said resolvers, means interconnecting said resolvers to produce in response to said reference signal a displacement error signal substantially proportional to the displacement error between said parts, means responsive to said displacement error signal for displacing said second part to compensate for said error, and means for injecting an additional signal to said one resolver related to said error signal in such a way as to include said resolvers in a negative feedback loop, said loop including amplifying means of sufficient gain to render said displacement error signal dependent substantially only on the displacement error between said first and second parts.

Figure 2:
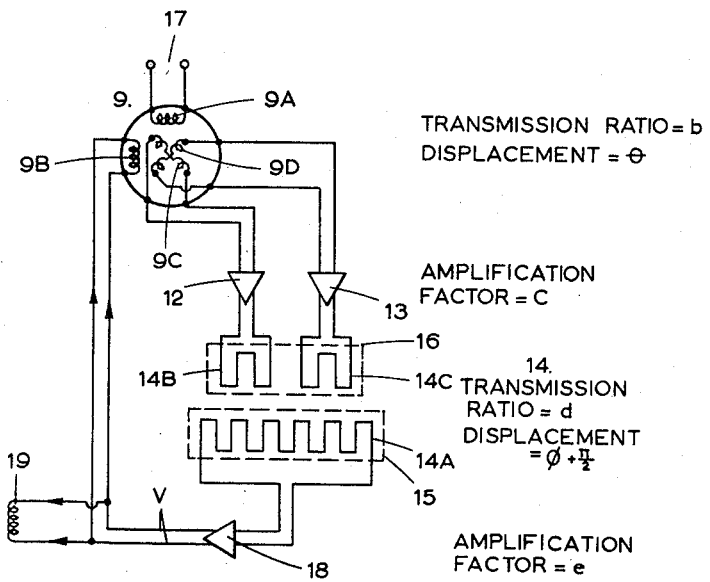
Figure 3:
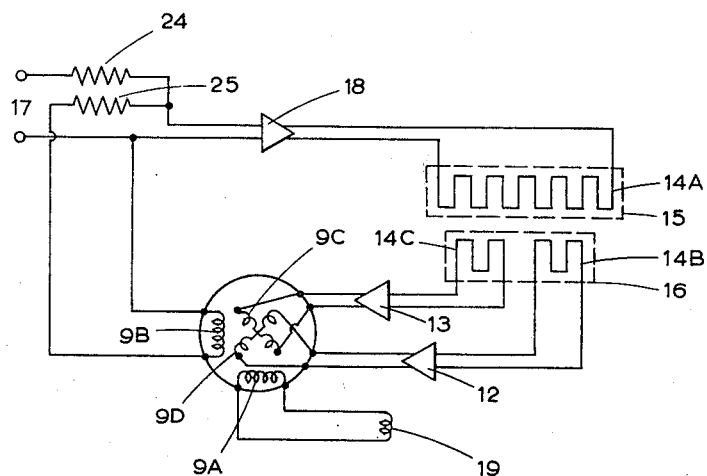
Figure 4:
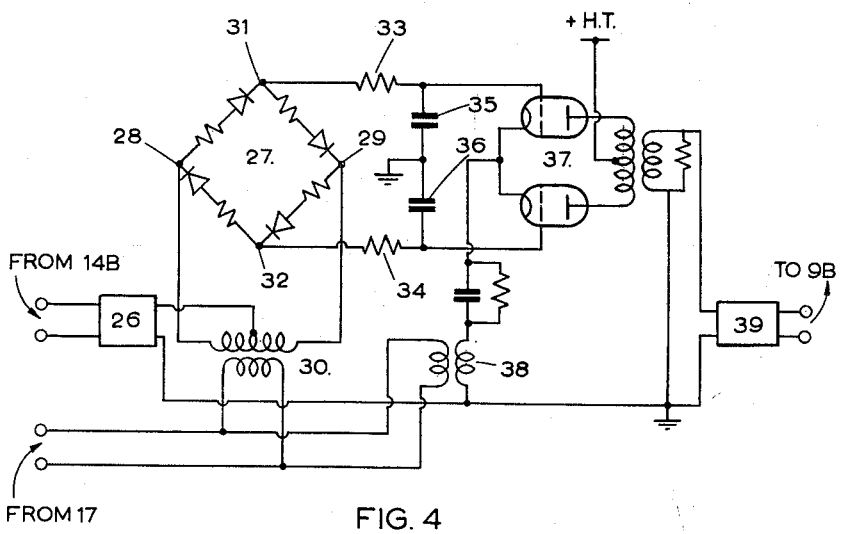

In order that the present invention may be clearly understood and readily carried into effect, the invention will now be described with reference to the accompanying drawings, in which:

FIGURE 1 represents diagrammatically, and partly in block form, one example of position control apparatus according to the present invention, FIGURE 2 shows part of the electrical circuit of the apparatus shown in FIGURE 1 including the internal connections of resolvers used therein, FIGURE 3 is a modified form which may be adopted for the electrical circuit of the apparatus shown in FIGURE 1, and FIGURE 4 illustrates the construction of one of the amplifiers used in the apparatus shown in FIGURE 1.

Corresponding components in the various figures are denoted by the same reference numerals.

It will be assumed that the apparatus shown in FIGURE 1 is part of an automatic control system which includes a machine tool and apparatus for controlling the position of the worktable with respect to the tool. The apparatus illustrated in FIGURE 1 is confined to that for producing displacement in one co-ordinate direction, but it will be understood that similar apparatus may be used for producing displacement in a second co-ordinate direction. Thus in FIGURE 1 the worktable of the machine is denoted by the reference 1 and it is displaceable to left or right in the plane of the drawing and with respect to a part 2 on which the worktable can slide. The part 2 may be fixed or may itself be displaceable in a direction normal to the plane of the drawing. Other parts of the machine, which may be conventional, have not been illustrated.

Displacement is imparted to the worktable 1 relative to the part 2 by means of a lead screw 3 co-operating with a nut 4 attached to the worktable 1. The lead screw is driven by means of a servo motor 5 through the intermediary of a shaft 6 and gearing denoted generally by the reference 7. A position analogue unit 8 is driven directly by the shaft 6, this unit comprising a potentiometer or series of cascaded potentiometers for generating a voltage representing the angular displacement of the shaft 6. The potentiometers are energised by a reference alternating a signal of fixed frequency and amplitude, applied at the terminals 17. In the present example this signal has an amplitude of 10 volts and a frequency of 1000 c./s. The output voltage of the unit 8 is derived by leads 10, one of which is connected to one of the terminals 17, and this output voltage is applied across the primary winding of the transformer 11. The position analogue unit may be of any suitable construction but a preferred construction is described in co-pending United States application Serial No. 484,202. It will be understood that the output voltage varies in amplitude to represent variations in the angular displacement of the shaft 6, and it can be assumed to represent accurately that angular displacement since any gears which may be employed in the position analogue unit 8 may be precision-cut backlash-free gears. Moreover as the mechanical loading on the gears is always relatively small, errors due to elasticity can be assumed to be negligible. In addition to driving the position analogue unit 8, the shaft 6 also drives a rotary resolver 9 the internal electrical connections of which are illustrated in greater detail in FIGURE 2.

The resolver 9 comprises two stator inductors 9A and 9B and two rotor inductors 9C and 9D. All the inductors are in the form of windings which have magnetic axes perpendicular to the axis of the shaft 6 and the stator windings 9A and 9B have a fixed orientation whereas the axes of the windings 9C and 9D rotate with the shaft 6. The magnetic axes of the windings 9C and 9D are perpendicular to each other, and the magnetic axes of the stator windings are also perpendicular to each other. As the shaft 6 rotates, the coupling factors from the winding 9A to the windings 9C and 9D vary with the sine and cosine respectively of the angular displacement. Moreover because the axis of the winding 9B is at right angles to the axis of the winding 9A, rotation of the shaft 6 causes the coupling factors from the winding 9B to the windings 9C and 9D to vary as the cosine and minus sine respectively of the angular displacement. In operation of the apparatus the stator winding 9A has applied to it the reference alternating signal from the terminals 17. This induces voltages in the quadrature windings 9D and 9C, and these voltages are applied via amplifiers 12 and 13 to the quadrature windings of a second resolver 14 (FIGURE 2). This resolver comprises inductors formed by planar zig-zag conductors and one inductor 14A, which is termed the reference inductor, is provided on a scale 15 fitted to the part 2 of the machine as indicated by the dotted lines in FIGURE 1. The other inductors of the resolver 14 comprise quadrature inductors 14B and 14C provided on a slide 16 which is fitted to the worktable 1 (as indicated in FIGURE 1) so as to be in parallel and superimposed relationship with respect to the scale 15. The quadrature inductors 14B and 14C are spaced on the scale in such a way as to be in phase quadrature relationship so that as the worktable is displaced linearly with respect to the member 2, the coupling factor from the reference inductor 14A to the quadrature inductors 14B and 14C varies as the sine and cosine respectively of the displacement, measured on a scale such that a displacement equal to one cycle of the zig-zag conductors corresponds to 360°. One cycle of the zig-zag conductors is twice the distance between adjacent limbs thereof measured along the axis of the scale or slide. One cycle of the zig-zag conductors is only a small fraction of the total displacement which may be imparted to the worktable 1 and the gearing 7 has such a velocity ratio that one revolution of the shaft 6 corresponds to a displacement of one cycle of the zig-zag conductors. Therefore one cycle of the resolver 9 corresponds to a displacement of the worktable 1 equal to one cycle of the resolver 14 so that the coupling factors of the two resolvers vary according to the same scale. The representation of the resolver 14 in FIGURE 2 is diagrammatic and it will be understood that the number of cycles is large compared with the number indicated, the spacing of the limbs being small, say 0.1 inch.

As aforesaid, voltages are induced in the quadrature windings 9C and 9D of the resolver 9 in response to the reference voltage applied to the terminals 17, and these voltages applied to the quadrature windings 14B and 14C respectively of the resolver 14 by way of the amplifiers 12 and 13 induce a voltage in the reference inductor 14A of that resolver. In setting up the arrangement, the worktable 1 and the shaft 6 are taken to be in equivalent positions when the angular displacement of the inductors 14B and 14C relative to the reference inductor 14A exceeds by $\pi/2$ that of the windings 9C and 9D relative to the winding 9A. As will appear, the voltage induced in the inductor 14A is substantially proportional to the displacement error between the shaft 6 and the worktable 1, and that voltage is applied via a high gain amplifier 18 to the primary winding of a transformer 19 and also to the second stator winding 9B of the resolver 9. The application of the error voltage to the winding 9B has the effect of enclosing the resolvers 9 and 14, the amplifiers 12 and 13, and the amplifier 18 in a negative feedback loop and provided the gain of the amplifier 18 is sufficient, the output signal of the amplifier 18 depends substantially only on the displacement error between the shaft 6 and the table 1. This will be explained subsequently.

The rectangle 20 represents a command signal generator which is arranged to set up an alternating signal, of the same frequency as the reference signal applied to the terminal 17 and of an amplitude representing a desired displacement of the worktable 1. The signal generated by the generator 20 may be a continuously variable signal or may be a discrete signal and accordingly the worktable 1 may be displaced either in a substantially continuous manner or in a discrete manner to positions represented by the command signal. The construction of the signal generator 20 forms no part of the present invention and will not be described further. The command signal from the generator 20 is applied to an amplifying and detecting circuit 21 by way of leads 22 and one of these leads includes the secondary windings of the transformers 11 and 19. The transformers 11 and 19 are poled in such a way that the displacement error signal from the amplifier 18, is added to and the position analogue signals derived from the position analogue unit 8 (and amplified if desired) is subtracted from the command signal. The servo motor 5 tends to rotate the shaft 6 to the position which will cause the resultant signal from the circuit 21 to become vanishingly small. This will occur when the angular displacement of the shaft 6 corresponds to the desired displacement of the worktable 1 together with an offset which compensates for the displacement error between the shaft 6 and the worktable 1, such displacement error arising as indicated in the mechanical coupling from the shaft 6 to the worktable. It will be understood that the input signal to the circuit 21 is an alternating signal of variable amplitude and the circuit 21 includes a phase sensitive detector to convert this signal into a uni-directional signal such as is required by the servo motor, the uni-directional signal having either polarity according to the sense of the displacement required from the servo motor.

In one commercially available form of resolver having inductors constituted by planar ziz-zag conductors, the voltage induced in the reference winding 14A, when the resolver is used as in FIGURES 1 and 2, may be a quarter of a cycle out of time phase relative to the reference signals applied to the terminals 17. In this case the amplifier 21 may be provided with a network to change the phase of the voltage applied to it so that the output voltage from amplifier 21 is in phase with the reference signal.

In order to explain the operation of the apparatus illustrated, assume that the output voltage of the amplifier 21 is V and that the voltage of the reference source has an amplitude $a$. Furthermore let the transmission ratio of the resolver 9 be $b$, let the angular displacement of the shaft 6 be $\theta$, let the gain of the amplifiers 12 and 13 be $c$, let the transmission ratio of the resolver 14 be $d$, let the gain of the amplifier 18 be $e$ and let the displacement of the table 1 be $$\phi + \frac{\pi}{2}$$

on the angular scale above referred to. These quantities are indicated in the drawing alongside the respective components.

The voltage across the winding 9C has an amplitude $$a.b. \sin \theta + V.b. \cos \theta$$

and the voltage across the winding 9D has an amplitude $$a.b. \cos \theta - V.b. \sin \theta$$

Therefore the voltages applied to the quadrature winding 14B has an amplitude $$c(a.b. \sin \theta + V.b. \cos \theta)$$

and that applied to the quadrature winding 14C has the amplitude $$c(a.b. \cos \theta - V.b. \sin \theta)$$

Therefore the voltage induced across the reference winding 14A is $$b.c.d. (a. \sin \theta + V. \cos \theta) \cos \phi$$
$$-b.c.d. (a. \cos \theta - V. \sin \theta) \sin \phi$$
$$= a.b.c.d. \sin (\theta-\phi) + V.b.c.d. \cos (\theta-\phi)$$

In general the displacement error between the shaft 6 and the worktable 1 is small so that $\theta-\phi$ is small. Therefore $\sin (\theta-\phi)$ may be taken as $(\theta-\phi)$ and $\cos (\theta-\phi)$ may be taken as unity without significant error. Remembering that the amplification factor of the amplifier 18 is $e$ it will now be seen that the output voltage of this amplifier is given by $$V = e[a.b.c.d. (\theta-\phi) + V.b.c.d.]$$

Therefore $$V = \frac{a.b.c.d.e.(\theta-\phi)}{1-b.c.d.e.}$$

It can therefore be seen that provided the loop gain $b.c.d.e.$ is large compared with 1, V is approximately equal to $-a. (\theta-\phi)$. In the apparatus illustrated it is ensured that the loop gain $b.c.d.e.$ is large compared with 1 by constructing the amplifier 18 to have a large gain, the loop gain being of the order of 300 in a practical case.

From the foregoing analysis it is apparent that by reason of negative feedback, the output signal V of the amplifier 18 is substantially independent of the transmission ratios of the resolvers so that the amplitude of the output signal from the amplifier represents absolutely the displacement error between the shaft 6 and the worktable 1. Therefore the signal V can be used directly to compensate for the transmission error in the mechanical coupling from the shaft 6 to the worktable 1. In the case of the planar resolver 14 the transmission ratio $d$ is critically dependent on the spacing between the scale 15 and slide 16 and it is difficult to maintain this spacing constant with adequate accuracy. The negative feedback, applied via the loop 9B, 9C, 12 and 13, 14B and 14C, 14A, 18 operates to maintain the input signal to the amplifier 18 at a vanishingly small value, and on this condition, as has been shown, the output of the signal of the amplifier 18, that is the input signal for the winding 9B, is dependent substantially only on the displacement error and within practical limits represents absolutely the offset required for the shaft 6 to compensate for displacement error in the mechanical coupling from the shaft 6 to the table.

The reference signal of amplitude $a$ need not be applied to the resolver driven by the shaft 6 and may alternatively be applied to the reference inductor 14A of the planar resolver. In the modification of the invention which is illustrated in FIGURE 3 this result is achieved by applying the reference signal from the terminals 17 to the reference winding 14A by way of the amplifier 18, a resistor 24 being connected as shown between the positive one of the terminals 17 and the corresponding input terminal of the amplifier 18. In this modification of the invention the displacement error signal is obtained from the reference winding 9A of the rotary resolver 9 which is driven by the shaft 6. The negative feedback signal is obtained from the other reference winding 9B, and it is applied to the amplifier 18 by way of the resistor 25 which is equal to the resistor 24. The resistors 24 and 25 operate in known manner as "see-saw" resistors and cause the input impedance of the amplifier 18 to be vanishingly small. The operation of the modification shown in FIGURE 3 is generally similar to that shown in FIGURE 2 and will not be further explained. The form of the invention illustrated in FIGURES 1 and 2 is however the preferred arrangement.

Other modifications in the connections of the resolvers may also be made. For example, the function of the rotor and stator windings of the resolver 9 may be interchanged.

The resolver 14 is termed a linear resolver inasmuch as the slide moves linearly with respect to the scale. In some applications of the invention, a rotary resolver of a similar construction, that is incorporating inductors in the form of planar zig-zag conductors, may be used. In such rotary resolvers, the limbs of the zig-zag inductors are usually radial with respect to the rotation axis of the resolver. Such rotary resolvers may for example be used where the worktable or other controlled part of the machine is subjected to angular movement by the servo motor 5. The slide and scale of the rotary planar resolver may then be provided directly on the table and supporting part as in the case of the linear resolver illustrated in FIGURES 1 and 2. Rotary resolvers may also be used with a linearly moving table; for example a resolver such as 9 may be driven from the worktable by means of a rack and pinion mechanism. In this form of the invention the rack and pinion is made with such precision that the output signal of the rotary resolver may be said to represent accurately the actual displacement of the worktable. The invention is not confined to the control of displacement of part of a machine tool, and is applicable generally to automatic position control. Furthermore the invention may be applied to arrangements in which the displacement error signal produced by the resolvers 9 and 14 as applied to a separate servo motor (which may be a hydraulic servo motor) adapted to displace the worktable directly and not via the shaft 6. The apparatus then corresponds to an automatic following arrangement, and the servo motor 5, shaft 6, position analogue unit 8 and resolver 9 may be remote from the machine including the worktable 1.

In designing the amplifier 18 shown in FIGURES 1, 2 and 3, the need arises, because of the high gain at the working frequency, to ensure that at all frequencies at which the loop gain is greater than unity the phase shift in the amplifier itself shall be less than 180°. However as elements with quadratic transfer functions are involved in the negative feedback loop, ringing at higher than the working frequency is liable to arise and it is difficult by means of passive filter networks to attenuate sufficiently rapidly relative to the phase shift produced to ensure stability.

To reduce this difficulty it is preferred to employ an amplifier of the construction illustrated in FIGURE 4. According to this figure the amplifier comprises initial stages represented by the rectangle 26 for amplifying the signal induced in the reference winding 14A of the resolver 14 and applying it to a phase sensitive rectifier denoted in general by the reference 27. This rectifier is of bridge form and the output signal of the stages 26 is applied in push-push to the terminals 28 and 29 of the bridge while a portion of the reference signal from terminals 17 is applied via a transformer 30 in push-pull to the same terminals 28 and 29. Before the rectification process, the desired error signal consists of a signal occupying a narrow band of frequencies centered on 1000 c./s. and consisting of a carrier wave modulated in amplitude according to the displacement error. After the rectification process the desired signal appears as a push-pull signal at the terminals 31 and 32, varying only at a frequency close to zero (being positive or negative according as the sign of the displacement error). The output signal of the rectifier is filtered by means of a low pass filter comprising resistors 33 and 34 and capacitors 35 and 36. By such a filter it is possible to attenuate rapidly, as the frequency increases, relative to the phase shift produced. The output of the filter 33—36 is now caused to remodulate the reference signal in the push-pull modulator stage 37, the reference signal being applied to the cathode of the modulator valves via the transformer 38. The output of the modulator, is further amplified in stages denoted by the rectangle 39 and applied thence to the winding 9B of the resolver 9 and via the transformer 19 to the servo motor 5. By employing an amplifier and filter of this construction, an attenuation of about 180 db/octave can be obtained without the relative shift exceeding ±90°. By the use of more complex filter networks, the attenuation may be further increased, the maximum phase shift in such cases being allowed to reach about 150°.

What we claim is:

1. Position control apparatus comprising a first displaceable part, a second displaceable part, two resolvers responsive respectively to displacements of said parts, means for applying a reference signal to one of said resolvers, means interconnecting said resolvers to produce in response to said reference signal a displacement error signal substantially proportional to the displacement error between said parts, means responsive to said displacement error signal for displacing said second part to compensate for said error, and means for injecting an additional signal to said one resolver related to said error signal to include said resolvers in a negative feedback loop, said loop including amplifying means of sufficient gain to render said displacement error signal dependent substantially only on the displacement error between said first and second parts.

2. Control apparatus according to claim 1 comprising a servo motor for displacing said first part in response to a command signal, a coupling from said first part to said second part for displacing said second part in accordance with displacement of said first part, means for deriving a feedback signal representing displacement of said first part, said servo motor being responsive to the difference of said command signal and said feedback signal and being additionally responsive to said displacement error signal thereby to displace said second part via said coupling to a position corresponding to said command signal.

3. Control apparatus according to claim 1 wherein said resolvers each comprise a reference inductor and two quadrature inductors magnetically coupled to the reference inductor so that in response to the respective displacement the coupling factors from the reference inductor to the quadrature inductors vary as the sine and cosine respectively of the displacement, wherein the means interconnecting said resolvers includes circuit connections from the quadrature inductors of one resolver to the quadrature inductors of the other resolver, and wherein said reference signal is applied to the reference inductor of one resolver and that resolver has a further reference inductor displaced by $\pi/2$ with respect to the first reference inductor, an amplifier being provided to amplify the signal induced in the reference inductor of the other resolver and apply the amplified signal to said further reference inductor as a negative feedback signal, the gain of said amplifier being sufficient to cause said amplified signal to depend substantially only on said displacement error whereby said amplified signal represents said displacement error signal.

4. Control apparatus according to claim 1 wherein said resolvers each comprise a reference inductor and two quadrature inductors magnetically coupled to the reference inductor so that in response to the respective displacement the coupling factors from the reference inductor to the quadrature inductors vary as the sine and cosine respectively of the displacement, wherein the means interconnecting said resolvers includes circuit connections from the quadrature inductors of one resolver to the quadrature inductors of the other resolver, and wherein one resolver has a further reference inductor displaced by $\pi/4$ with respect to the first reference inductor, an amplifier being provided to superimpose the signal induced in said further reference inductor, as negative feedback, on said reference signal and apply the superimposed signals to the reference inductor of the other resolver, the gain of said amplifier being sufficient to cause the signal induced in the first reference inductor of said one resolver to depend substantially only on the displacement error between said first and second parts, whereby said signal represents said displacement error signal.

5. Control apparatus according to claim 3 wherein the reference inductor of the resolver responsive to the movement of said second part comprises a planar zig-zag conductor and the respective quadrature inductors comprise planar zig-zag conductors mounted in parallel and superimposed relationship to said first mentioned zig-zag conductor.

6. A control system according to claim 5 wherein said first part comprises a shaft and the resolver responsive to displacement thereof comprises windings which have their magnetic axes perpendicular to the axis of said shaft, the coupling for displacing said second part comprising a mechanical coupling from said shaft to said second part of such a velocity ratio that one revolution of said shaft corresponds to a displacement of said second part of one cycle of said zig-zag conductors.

7. Control apparatus according to claim 1 wherein said first part and said reference part comprises two parts of an automatic machine, relative displacement between said parts being adapted to displace a tool with respect to a worktable of said machine.

8. Control apparatus according to claim 2 wherein said resolvers each comprise a reference inductor and two quadrature inductors magnetically coupled to the reference inductor so that in response to the respective displacement the coupling factors from the reference inductor to the quadrature inductors vary as the sine and cosine respectively of the displacement, wherein the means interconnecting said resolvers includes circuit connections from the quadrature inductors of one resolver to the quadrature inductors of the other resolver, and wherein one resolver has a further reference inductor displaced by $\pi/4$ with respect to the first reference inductor, an amplifier being provided to superimpose the signal induced in said further reference inductor, as negative feedback, on said reference signal and apply the superimposed signals to the reference inductor of the other resolver, the gain of said amplifier being sufficient to cause the signal induced in the first reference inductor of said one resolver to depend substantially only on the displacement error between said first and second parts, whereby said signal represents said displacement error signal.

9. Control apparatus according to claim 4 wherein the reference inductor of the resolver responsive to the movement of said second part comprises a planar zig-zag conductor and the respective quadrature inductors comprise planar zig-zag conductors mounted in parallel and superimposed relationship to said first mentioned zig-zag conductor.

10. Position control apparatus comprising a displaceable part, drive means, a mechanical coupling which is liable to transmission error for producing displacement of said part in response to said drive means, two resolvers which are mechanically coupled respectively to said drive means and to said part by means which are substantially less liable to transmission error than said mechanical coupling, means for applying a reference signal to one of said resolvers, means for electrically connecting the output of said one resolver to the input of the other resolver and means for deriving from said other resolver an electrical error signal substantially proportional to the transmission error of said mechanical coupling, and means for imparting displacement to said in response to said error signal so as to allow for said transmission error.

11. Position control apparatus according to claim 10 wherein each resolver comprises a reference inductor and two quadrature inductors magnetically coupled to the reference inductor, the reference inductor or the two quadrature inductors of one resolver being fixed to said part, the reference inductor or the two quadrature inductors of the other resolver being coupled to said drive means, and the other said inductors of the respective resolvers being fixed to parts of reference.

References Cited in the file of this patent

UNITED STATES PATENTS

| | | |
|---|---|---|
| 2,750,545 | Davis | June 12, 1956 |
| 2,766,413 | Young | Oct. 9, 1956 |
| 2,849,668 | Tripp | Aug. 26, 1958 |
| 2,866,946 | Tripp | Dec. 30, 1958 |
| 2,907,937 | Apgar et al. | Oct. 6, 1959 |
| 2,950,427 | Tripp | Aug. 23, 1960 |